United States Patent
Foskey et al.

(10) Patent No.: US 9,523,278 B2
(45) Date of Patent: Dec. 20, 2016

(54) ACTUATION SYSTEM FOR AN ACTIVE BLADE ELEMENT OF A ROTOR BLADE

(71) Applicant: Bell Helicopter Textron Inc., Fort Worth, TX (US)

(72) Inventors: Christopher Foskey, Keller, TX (US); Frank B. Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 623 days.

(21) Appl. No.: 14/051,575

(22) Filed: Oct. 11, 2013

(65) Prior Publication Data

US 2015/0104307 A1 Apr. 16, 2015

(51) Int. Cl.
| | |
|---|---|
| *F01D 5/12* | (2006.01) |
| *F01D 7/00* | (2006.01) |
| *B64C 27/72* | (2006.01) |
| *B64C 27/615* | (2006.01) |

(52) U.S. Cl.
CPC ............... *F01D 5/12* (2013.01); *B64C 27/615* (2013.01); *B64C 27/72* (2013.01); *F01D 7/00* (2013.01); *B64C 2027/7266* (2013.01); *Y02T 50/34* (2013.01)

(58) Field of Classification Search
CPC .............. F01D 5/12; F01D 7/00; B64C 27/72; B64C 27/315; B64C 2027/7266; B64C 9/16; B64C 9/18; B64C 3/50; B64C 2027/7272; B64C 2027/7294
USPC ......... 74/89.2, 89.21, 89.22; 318/6, 7, 9, 14, 318/135
See application file for complete search history.

(56) References Cited

U.S. PATENT DOCUMENTS

2013/0224025 A1 8/2013 Foskey et al.

FOREIGN PATENT DOCUMENTS

| EP | 0734947 | 10/1996 | | |
|---|---|---|---|---|
| EP | 1083123 | 3/2001 | | |
| GB | 2299562 | 10/1996 | | |
| GB | 2299562 A | * 10/1996 | ........... | B64C 27/615 |
| WO | 2012/060806 | 5/2012 | | |
| WO | WO 2012060806 A1 | * 5/2012 | ........... | B64C 27/615 |

OTHER PUBLICATIONS

Communication Pursuant to Article 94(3) EPC issued in European Application No. 14159702.1 on Feb. 19, 2015; 6 pages.
Communication under Rule 71(3) EPC issued in European Application No. 14159702.1 on Sep. 30, 2015; 33 pages.
European Search Report issued in European Application No. 14159702.1 on Jul. 9, 2014, 3 pages.

* cited by examiner

*Primary Examiner* — Dwayne J White
*Assistant Examiner* — Brian P Wolcott (57) ABSTRACT

One example of an actuation system for an active blade element of a rotor blade includes an actuator system coupled to a linear transmission system. The actuator system attaches to a structure within a rotor blade and provides a linear motion in a direction that is spanwise to the rotor blade. The linear transmission system is coupled with the actuator system and to an active blade element attached to the rotor blade. The linear transmission system receives the linear motion provided by the actuator system, and responsively provides at least a partial rotation of the active blade element about an axis of the linear transmission system which is in the direction that is substantially parallel to the spanwise axis of the rotor blade.

19 Claims, 7 Drawing Sheets

ACTUATION SYSTEM FOR AN ACTIVE BLADE ELEMENT OF A ROTOR BLADE

TECHNICAL FIELD

This disclosure relates to actuating an element of a rotor blade.

BACKGROUND

An aircraft can be operated by attaching one or more aerodynamic blade elements to the aircraft's blades (e.g., rotor blades), and actively controlling the movement of the aerodynamic blade elements. Such active control can improve a performance of the rotor blade.

SUMMARY

This disclosure describes an actuation system for an active blade element of a rotor blade.

One innovative aspect of the subject matter described here can be implemented as a system to actuate an active blade element attached to a rotor blade. The system includes an actuator system adapted to attach to an internal surface of a rotor blade. The actuator system is adapted to provide a linear motion in response to receiving a control signal. The linear motion is in a direction that is parallel to the spanwise axis of the rotor blade. The system includes a linear transmission system attached to the actuator system and to an active blade element attached to the rotor blade. The linear transmission system is adapted to receive the linear motion provided by the actuator system. In response to the linear motion provided by the actuator system, the linear transmission system is adapted to provide at least a partial rotation of the active blade element about an axis of the linear transmission system. The axis is in the direction that is spanwise to the rotor blade.

This and other aspects can include one or more of the following aspects. The actuator system can include a first linear actuator and a second linear actuator, each of which is attached to the rotor blade in the direction that is parallel to the spanwise axis of the rotor blade. The actuator system can further include one or more coaxially coupled pushrods that connect the first linear actuator and the second linear actuator in a redundancy arrangement. A first pulley can be attached to the rotor blade near a first end of the actuator system. A first ribbon cable can be routed around the first pulley to connect the first end of the actuator system and a first end of the linear transmission system. A second pulley can be attached to the rotor blade near a second end of the actuator system. A second ribbon cable can be routed around the second pulley to connect the second end of the actuator system and a second end of the linear transmission system. The first pulley, the first ribbon cable, the second pulley, and the second ribbon cable can create a pre-tensioned loop assembly with the actuator system.

The linear transmission system can include an inner elongated tubular member attached to the actuator system adapted to receive the linear motion provided by the actuator system and to traverse linearly in the direction that is parallel to the spanwise axis of the rotor blade responsive to the linear motion provided by the actuator system. The linear transmission system can include an outer elongated tubular member positioned outside the inner elongated tubular member. The outer elongated tubular member can be attached to the active blade element, can be connected to the inner elongated tubular member, and can be adapted to at least partially rotate on an axis of the outer elongated tubular member in response to the inner elongated tubular member traversing linearly in the direction that is spanwise to the rotor blade. The inner elongated tubular member can be attached to the rotor blade using linear slide bearings.

The system can further include a central elongated tubular member positioned between the inner elongated tubular member and the outer elongated tubular member. The central tubular member can be attached to the rotor blade. The central elongated tubular member can include multiple spanwise slots formed on an outer surface of the central elongated tubular member. The multiple spanwise slots can be arranged in the direction that is parallel to the spanwise axis of the rotor blade. The inner elongated tubular member includes multiple first helical grooves formed in a first direction on an outer surface of the inner elongated tubular member. The outer elongated tubular member can include multiple second helical grooves formed in a second direction that is opposite to the first direction. A first helical groove, a spanwise slot, and a second helical groove intersect when the inner elongated tubular member, the central elongated tubular member and the outer elongated tubular member are positioned in the linear transmission system. The system can include multiple ball bearings, each positioned in a spanwise slot at an intersection of the first helical groove, the spanwise slot and the second helical groove. The outer elongated tubular member can include multiple helical grooves formed on an outer surface of the outer elongated tubular member. The system can include multiple cylindrical pegs. A cylindrical peg can be attached to an outer surface of the inner elongated tubular member and be positioned in a helical groove formed on the outer surface of the outer elongated tubular member. The system can include multiple roller bearings. A roller bearing can be mounted to a cylindrical peg to form a functional fit and rotate within the helical groove.

Another innovative aspect of the subject matter described here can be implemented as a method to actuate an active blade element attached to a rotor blade. A linear motion of an actuator system attached to a rotor blade is generated in a direction that is parallel to the spanwise axis of the rotor blade. The linear motion of the actuator system is transferred to a linear transmission system attached to the rotor blade in the direction that is parallel to the spanwise axis of the rotor blade. An at least partial rotation of the linear transmission system is generated in response to the linear motion of the actuator system. The at least partial rotation of the linear transmission system is transferred to an active blade element attached to the rotor blade.

This, and other aspects, can include one or more of the following aspects. The linear transmission system can include an inner elongated tubular member attached to the rotor blade and an outer elongated tubular member attached to the active blade element. The outer elongated tubular member can include multiple helical grooves on an outer surface of the outer elongated tubular member. The linear transmission system can include multiple cylindrical pegs, a cylindrical peg positioned in a helical groove, and multiple roller bearings, a roller bearing mounted to a cylindrical peg to form a functional fit and rotate within the helical groove. Generating the at least partial rotation of the linear transmission system in response to the linear motion of the actuator system can include rotating the cylindrical peg in the helical groove in response to receiving the linear motion of the actuator system.

The linear transmission system can include an inner elongated tubular member attached to the rotor blade through slider bearings to allow for motion in the spanwise direction. The inner elongated tubular member can include multiple first helical grooves formed in a first direction on an outer surface of the inner elongated tubular member. The linear transmission system can include an outer elongated tubular member rigidly attached to the active blade element through journal bearings to allow rotational motion, the outer elongated tubular member can include multiple second helical grooves formed in a direction opposite the first direction on an outer surface of the outer elongated tubular member. The linear transmission system can include a central elongated tubular member positioned and fixed rigidly to the blade between the inner elongated tubular member and the outer elongated tubular member. The central elongated tubular member can include multiple spanwise slots arranged in the direction spanwise to the rotor blade. A first helical groove, a spanwise slot and a second helical groove can intersect. Generating the at least partial rotation of the linear transmission system output in response to the linear motion of the actuator system can include generating a linear motion of the inner elongated tubular member in the direction that is spanwise to the rotor blade resulting in at least a partial rotation of the outer elongated tubular member.

A further innovative aspect of the subject matter described here can be implemented as a system to actuate an active blade element attached to a rotor blade. The system includes an actuator system attached to a rotor blade and adapted to provide a linear motion in a direction that is spanwise to the rotor blade. The system includes a linear transmission system that includes an inner elongated tubular member and an outer elongated tubular member. The inner elongated tubular member is attached to the actuator system and adapted to traverse linearly in the direction that is spanwise to the rotor blade in response to receiving the linear motion provided by the actuator system. The outer elongated tubular member is positioned concentrically with the inner elongated tubular member and attached to an active blade element of the rotor blade. The outer elongated tubular member is adapted to at least partially rotate about an axis that is in the direction that is spanwise to the rotor blade in response to the inner elongated tubular member traversing linearly.

This, and other aspects, can include one or more of the following features. The actuator system and the linear transmission system can be centered at a position that is substantially three-quarters of the rotor blade length measured from a root end of the rotor blade.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to an actuation system for an active blade element (e.g., an active flap) of a rotor blade. Some active rotor blade designs used in rotorcrafts may implement rods and bearing rod ends or other attachments that enable actively controlling the flaps. Some active rotor blade designs implement piezoelectric devices with force-multiplying trusses, ball or jackscrews, and bellcranks to obtain flap motion. In such active rotor blade designs, a direction of motion output of an actuator system may be divergent relative to a direction of motion of the flap. In addition, the sizing of the actuator system for such flaps may adversely affect the rotor blade contour and aerodynamic effects on the blade. Moreover, such actuator systems may lack the bandwidth capability and response that provides optimum flap performance.

This disclosure describes a system for active rotor blade trailing edge flap actuation. The system can be implemented in any rotorcraft blade that is capable of physically housing the system and that employs a trailing edge flap type assembly for active control. The system can operate at high frequencies and can realize reduced fatigue loading of the transmission components relative to active rotor blade designs such as those described above. The system and the flap mechanism are scalable to large and small rotor blades. The space occupied by the system on the rotor blade may not be significant. The relative motion of the masses in the system is opposite in direction, thereby reducing CG shift and fatigue loading on the blade structure. The system can be implemented to be lightweight, compact, wear resistant and powerful. The system is preloaded with mass balancing and minimizes compromise on the contour of the rotor blade. Variations on actuator placement can allow for the minimization of counterweights to offset flap and transmission hardware mass. The actuators implemented in this system have excellent bandwidth and displacement capabilities relative to alternative technologies. Implementing the system described here in a helicopter rotorblade can, among other things, enable quieter operation of the helicopter, reduce rotor induced vibration and increase overall aerodynamic performance all throughout varying operating regimes.

Figures 1, 2:
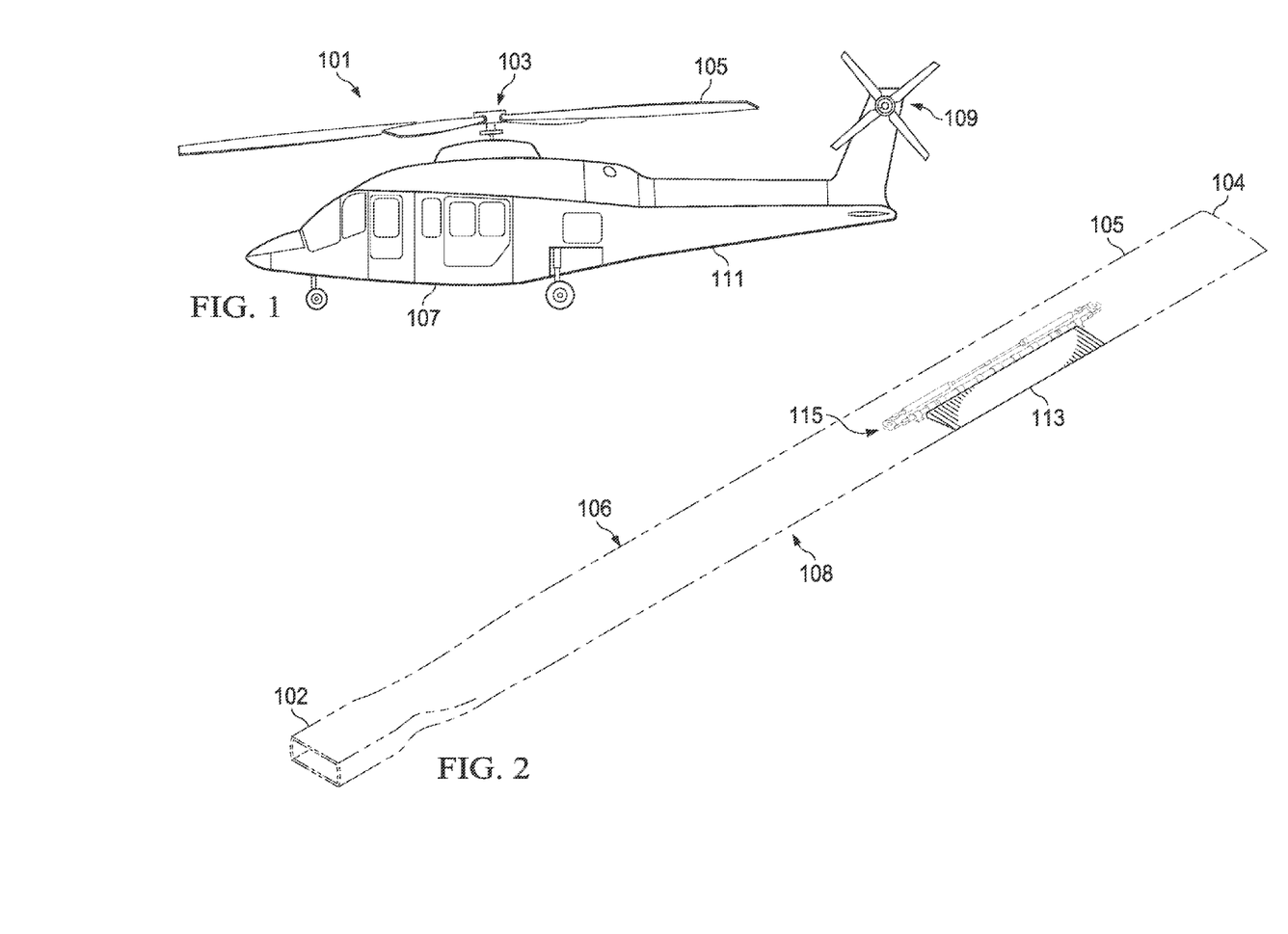
FIG. 1 illustrates a side view of a rotorcraft having a rotor blade with an active flap.
FIG. 2 illustrates a perspective view of the rotor blade including a system to actuate the rotor flap.

FIG. 1 illustrates a side view of a rotorcraft 101 having a rotor blade with an active flap. The rotorcraft 101 has a rotor system 102 with multiple rotor blades (e.g., a rotor blade 105). The pitch of each rotor blade 105 can be managed to selectively control operational features of the rotorcraft 101, e.g., direction, thrust, lift, and other operational features. The rotorcraft 101 can include a fuselage 107, an anti-torque system 109, and an empennage 111. In some implementations, the rotorcraft 101 can be a helicopter, while, in others, the rotorcraft 101 can include, e.g., a hybrid aircraft, a tilt rotor aircraft, an unmanned aircraft, gyrocopters, and one or more other variety helicopter configurations.

FIG. 2 illustrates a perspective view of the rotor blade 105 including a system 115 to actuate the rotor flap 113. The rotor blade 105 includes a root end 102, a tip end 104, a leading edge portion 106 and a trailing edge portion 108. In some implementations, the flap 113 can be attached to the trailing edge portion 108 of the rotor blade 105, as shown in FIG. 2. Alternatively (or in addition), an active blade element can be implemented as a leading edge droop attached to the leading edge portion 106 of the rotor blade 105. The system 115 can be implemented to actuate either or both active blade elements. Further, each rotor blade in the rotorcraft 101 can include an active blade element like the flap 113 in the rotor blade 105. Also, the system can be positioned spanwise at a location determined to be most effective from an aerodynamic standpoint based upon the design attributes of the actuated flap/lift-altering device. For example, the system 115 can be centered at a position that is substantially three-quarters of the rotor blade length measured from a root end 102 of the rotor blade 105.

The system 115 to actuate the active blade element (e.g., the flap 113) attached to the rotor blade 105 can include an actuator system and a linear transmission system, described below with reference to FIGS. 3-6. The actuator system can be attached to an internal structure of the rotor blade 105 to provide a linear motion. For example, the actuator system can be connected to a controller (not shown) to receive a control signal in response to which the actuator system can provide the linear motion in a direction that is spanwise to the rotor blade 105. The linear transmission system can be attached to the actuator system and to the flap 113. The linear transmission system can receive the linear motion provided by the actuator system. In response, the linear transmission system can provide at least a partial rotation of the flap 113 about an axis of the linear transmission system that is in the direction that is spanwise to the rotor blade 105. Each rotor blade can include a respective system like the system 115 attached to the rotor blade 105 to actuate the flap 113.

Figure 3A:
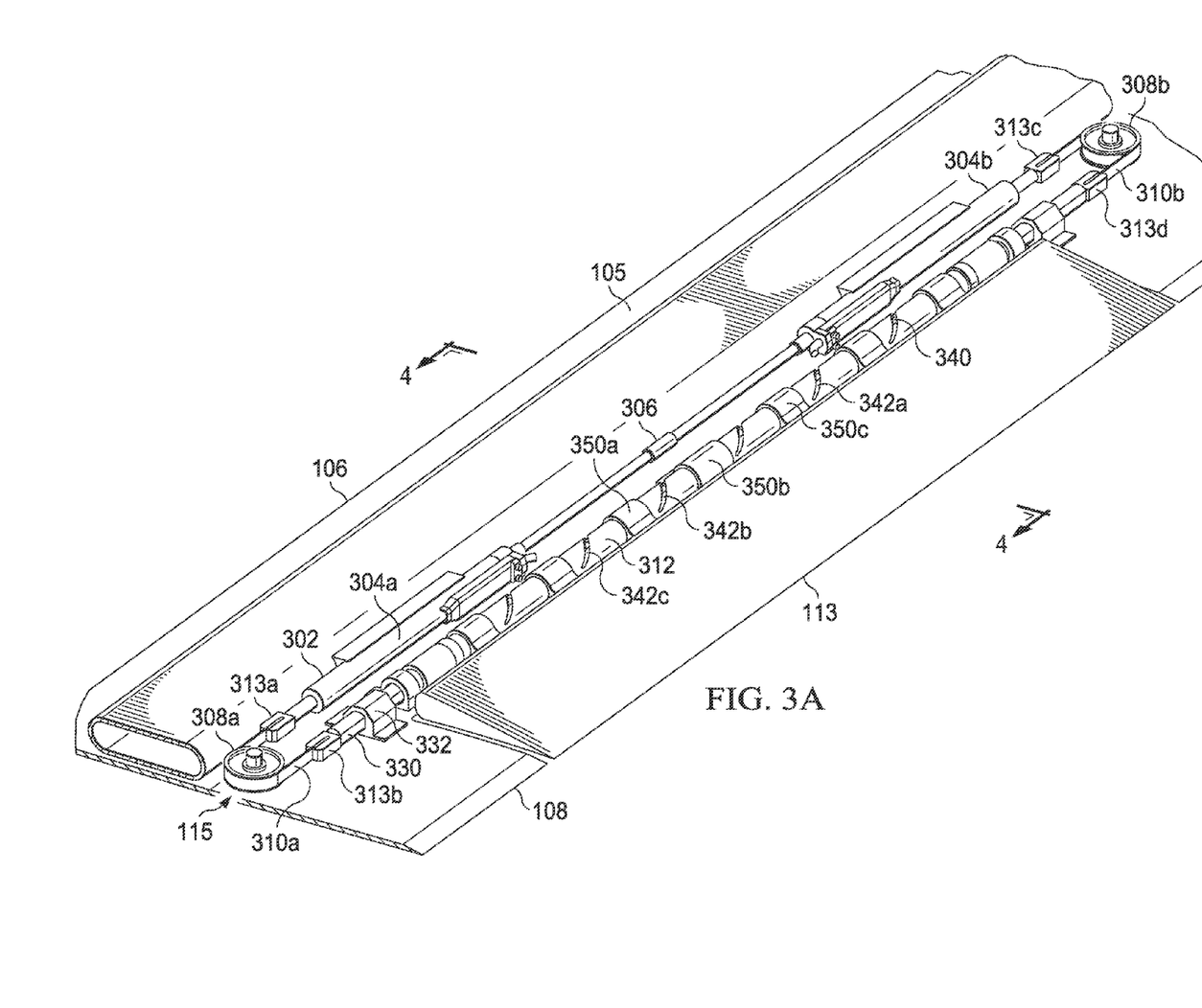
FIGS. 3A-3D illustrates perspective views of a first implementation of a system to actuate an active blade element attached to a rotor blade.
Figure 3B:
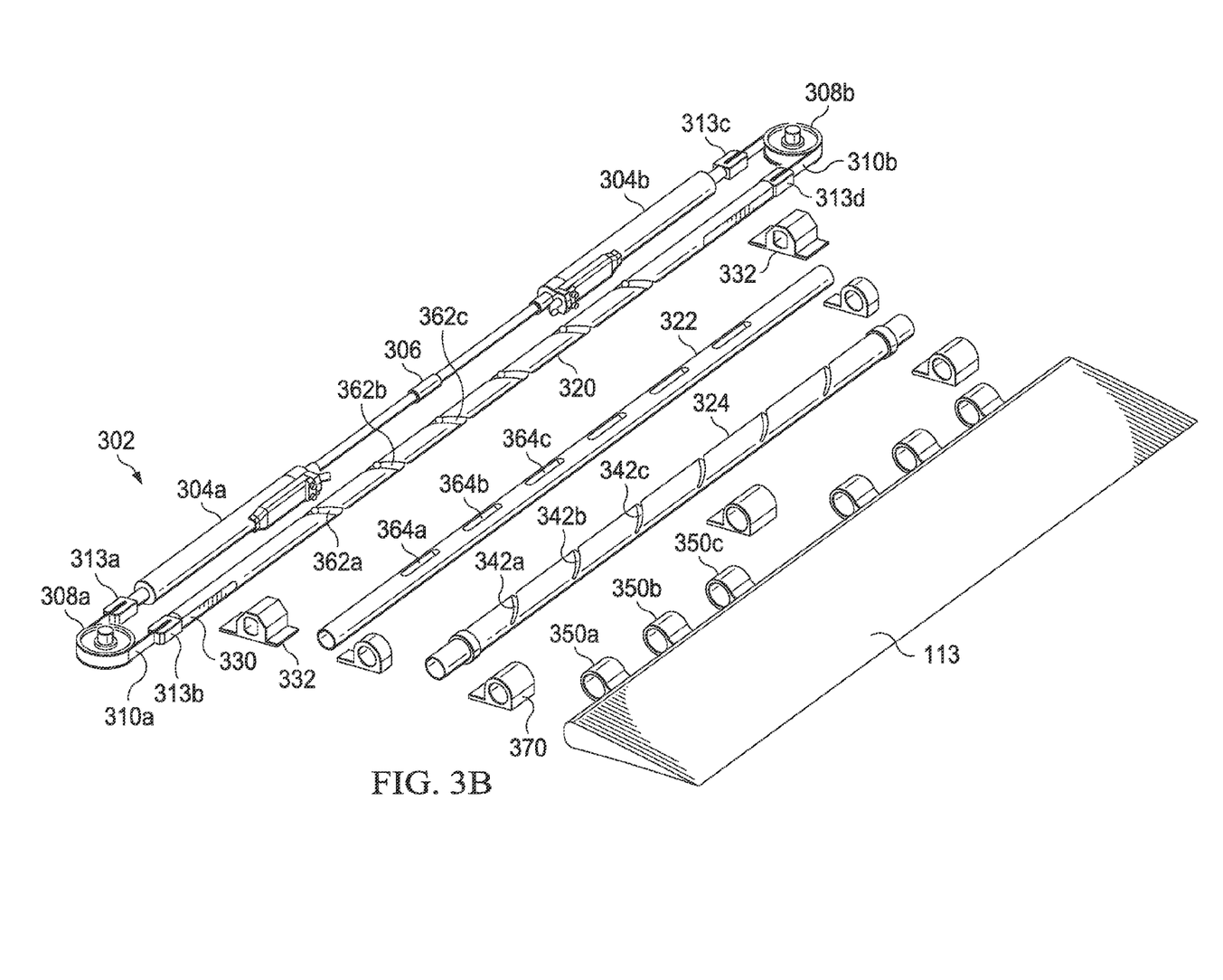
Figures 3C, 3D:
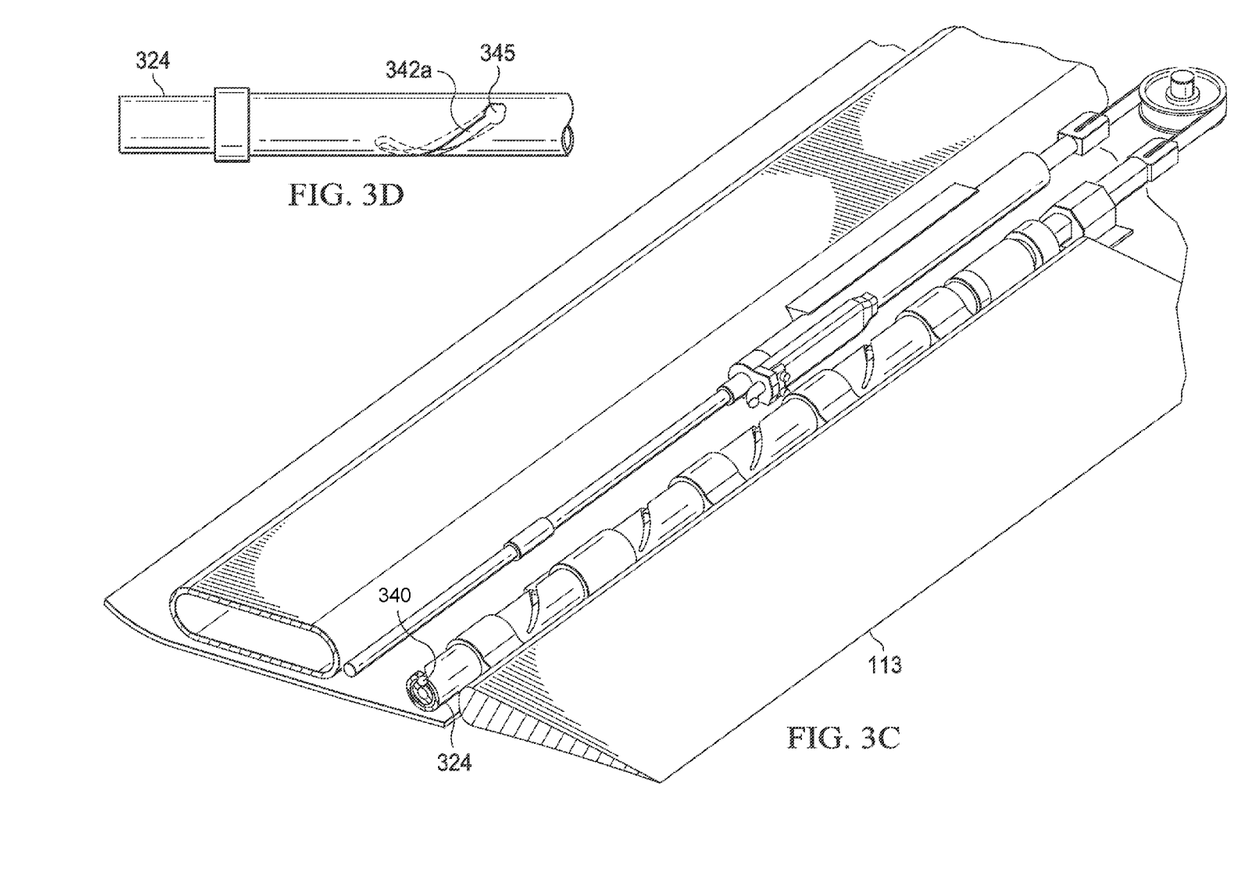
Figure 4:
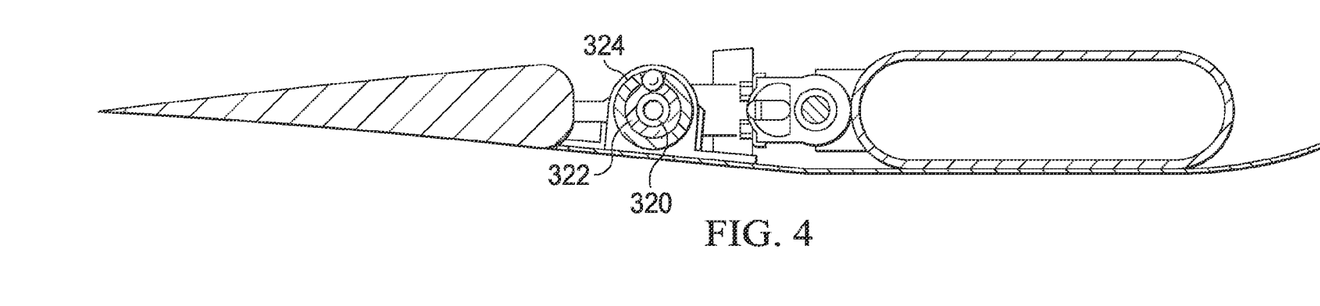
FIG. 4 illustrates a partial cross-sectional view of the system of FIG. 3.

FIGS. 3A, 3B and 4 illustrate perspective views and a partial cross-sectional view, respectively, of a first implementation of a system 115 to actuate an active blade element (e.g., the flap 113) attached to a rotor blade 105. FIG. 3C illustrates a perspective view a virtual section cut at the root end such that the spar profile and skin shape is easily visualized. The system 115 includes an actuator system 302 and a linear transmission system 312. The actuator system 302 includes one or more linear actuators (e.g., a first linear actuator 304a and a second linear actuator 304b), each of which is attached to the rotor blade 105 in the direction that is spanwise to the rotor blade 105. The number of actuators can be sufficient to provide the at least partial rotation of the flap 113, as described below. Accordingly, only one actuator with sufficient power to provide the at least partial rotation may be sufficient, in some implementations. The one or more linear actuators can be mounted substantially parallel to the spanwise axis of the rotor blade 105, e.g., to the aft wall of a structural spar. One or more coaxially coupled pushrods can connect the one or more linear actuators. For example, the pushrod 306 can connect the first linear actuator 304a and the second linear actuator 304b in a redundancy arrangement. For example, the second linear actuator 304b can be a redundant/backup component of the actuator system 302 which can operate if a linear force generated by the first linear actuator 304c does not satisfy a threshold linear force. Alternatively, the first linear actuator 304a can be the redundant/backup component.

The system 115 can include a first pulley 308a and a second pulley 308b attached to the rotor blade 105 near a first end and a second end, respectively, of the actuator system. For example, the second pulley 308b can be attached to the rotor blade 105 nearer to the tip end 104 and the second pulley 308a can be attached to the rotor blade 105 nearer to the root end 102. A first ribbon cable 310a and a second ribbon cable 310b can be routed around the first pulley 308a and the second pulley 308b, respectively, to connect the first end and the second end, respectively, of the actuator system 302 to a first end and a second end, respectively, of the linear transmission system 312. For example, clevises 313a and 313b can connect the ends of the first ribbon cable 310a to the first ends of the actuator system 302 and the linear transmission system 312. Similarly, devises 313c and 313d can connect the ends of the second ribbon cable 310b to the second ends of the actuator system 302 and the linear transmission system 312. In this manner, the first pulley 308a, the first ribbon cable 310a, the second pulley 308b and the second ribbon cable 310b create a pre-tensioned loop assembly with the actuator system 302. The opposing motion of the one or more pushrods versus the components of the linear transmission system 312, described below, allow for balanced forces within the rotor blade 105. Because the actuator rods move in a direction opposite to a direction of motion of an elongated member of the actuator system 302 (described below), the spanwise CG shift of the overall assembly can be reduced. Consequently, blade loading can also be reduced and the dynamic tuning may not be largely affected.

As shown in FIGS. 3B and 4, the linear transmission system 312 includes an inner elongated tubular member 320 attached to the actuator system 302 to receive the linear motion provided by the actuator system 302. For example, an end of the first ribbon cable 310a is attached to an end of the inner elongated tubular member 320 using the clevis 313b. Similarly, an end of the second ribbon cable 310b is attached to the other end of the inner elongated tubular member 320 using the clevis 313d. In response to receiving the linear motion provided by the actuator system 302, the inner elongated member 320 traverses linearly in the direction that is parallel to the spanwise axis of the rotor blade 105. In some implementations, the inner elongated tubular member 320 is attached to the rotor blade 105 using linear slide bearings 332. Ends of the inner elongated tubular member 320 include flat surfaces (e.g., flat surface 330), which engages with the linear slide bearing 332 to prevent the inner elongated tubular member 320 from rotating about its axis. Multiple helical grooves 362 (e.g., a first helical groove 362a, a second helical groove 362b, a third helical groove 362c) are formed on an outer surface of the inner elongated tubular member 320. Each helical groove is formed at an angle to a spanwise axis of the inner elongated tubular member 320.

The linear transmission system 302 includes a central elongated tubular member 322 positioned outside the inner elongated tubular member 320. The central elongated tubular member 322 is attached to the rotor blade 105. The central elongated tubular member 322 includes multiple spanwise slots 364 (e.g., a first spanwise slot 364a, a second spanwise slot 364b, a third spanwise slot 364c) formed on an outer surface of the central elongated tubular member 322. Further, the multiple spanwise slots 364 are arranged such that when the inner elongated tubular member 320 is positioned within the central elongated tubular member, as shown in FIGS. 3 and 4, the multiple helical grooves 362 and the multiple spanwise slots 364 intersect.

The linear transmission system 302 includes an outer elongated tubular member 324 positioned outside the inner elongated tubular member 320 and the central elongated tubular member 322. The outer elongated tubular member 324 is connected to the inner elongated tubular member 320 and to the central elongated tubular member 322 to at least partially rotate on an axis of the outer elongated tubular 324 in response to the inner elongated tubular member 320 traversing linearly in the direction that is spanwise to the rotor blade 105.

To do so, the outer elongated tubular member 324 includes multiple helical grooves (e.g., a first helical groove 342a, a second helical groove 342b, a third helical groove 342c) formed on an outer surface of the outer elongated tubular member 324 in a direction that is opposite the direction of the multiple helical grooves formed on an outer surface of the inner elongated tubular member 320. The helical grooves on the inner and outer elongated tubular members and the spanwise slots on the central elongated tubular member are formed such that a helical groove of the inner elongated tubular member 320, a spanwise slot of the central elongated tubular member 322, and a helical groove of the outer elongated tubular member 324 intersect. For example, when the inner elongated tubular member 320 is positioned within the central elongated tubular member 322, and the two tubular members are positioned within the outer elongated tubular member 324, the helical grooves and the spanwise slots intersect and align in a direction on the radius of the outer elongated tubular member 324.

Multiple ball bearings (e.g., ball bearing 340) are positioned in respective multiple spanwise slots formed in the central elongated tubular member 322. Each ball bearing is positioned at an intersection of a helical groove of the inner elongated tubular member 320, a spanwise slot of the central elongated tubular member 322, and a helical groove of the outer elongated tubular member 324. To do so, a hole 345 (FIG. 3D) larger than a helical groove diameter (e.g., diameter of helical groove 342a) is formed at an end of each helical groove. Each ball bearing is mounted in the intersection described above through the oversized hole. For example, the ball bearings are inserted into the helical grooves via the oversized hole at the extreme end of each slot when the outer elongated member 324 is rotated to the maximum angle that aligns the hole with the groove and slot arrangement of the companion elongated members. The length of the spanwise slot is such that normal operation of the assembly would not articulate the outer elongated member 324 to such a degree to re-expose the ball bearings to the oversized hole. The dimensions of the ball bearings are selected according to a tolerance stackup for the entire assembly. Such sizing allows the assembly to operate effectively without backlash.

The outer elongated tubular member 324 is attached to the flap 113. For example, the outer elongated tubular member 324 is rigidly attached to the flap 113 using multiple clamps (e.g., a first clamp 350a, a second clamp 350b, a third clamp 350c) positioned at different positions in the direction that is spanwise to the rotor blade 105 and near a leading edge of the flap 113. As described below, the centerline of the attachment clamps 350 is the axis of rotation of the flap itself. The assembly (i.e., the system 115 and the flap 113) is attached to the rotor blade 105 using multiple clamps 370 that incorporate thrust bearings (e.g., ceramic thrust bearings) that can cope with the centrifugal forces on the linear transmission system 312 and the flap 113.

To actuate the flap, the actuator system 302 is operated to generate a linear motion in a direction that is spanwise to the rotor blade 105. The pre-tensioned loop assembly that includes the ribbon cables transfers the linear motion to the linear transmission system 312. For example, the ribbon cables transfer the linear motion generated by the actuator system 302 to the inner elongated tubular member 320, which traverses linearly in the direction that is spanwise to the rotor blade 105. The helical grooves formed on the inner elongated tubular member 320 also traverse linearly, which responsively generates an at least partial rotation of the outer elongated tubular member 324. The ball bearings positioned at the intersection of the helical grooves and the spanwise slots operate to transfer the linear motion of the inner elongated tubular member 320 to the at least partial rotation of the outer elongated tubular member 324. A range of the rotation is controlled by dimensions of the helical grooves formed on the inner and outer elongated tubular members, the dimensions of the spanwise slots, and an amount of linear traversal of the actuator loop. Because the outer elongated tubular member 324 is attached to the flap 113 (e.g., near the leading edge of the flap 113), the at least partial rotation of the outer elongated tubular member 324 is transferred to the flap 113, thereby actuating the flap 113 to rotate about the axis that is parallel to the spanwise axis of the rotor blade 105. In this manner, the flap 113 can be actuated, e.g., at different frequencies such as 30 Hz.

Figure 5A:
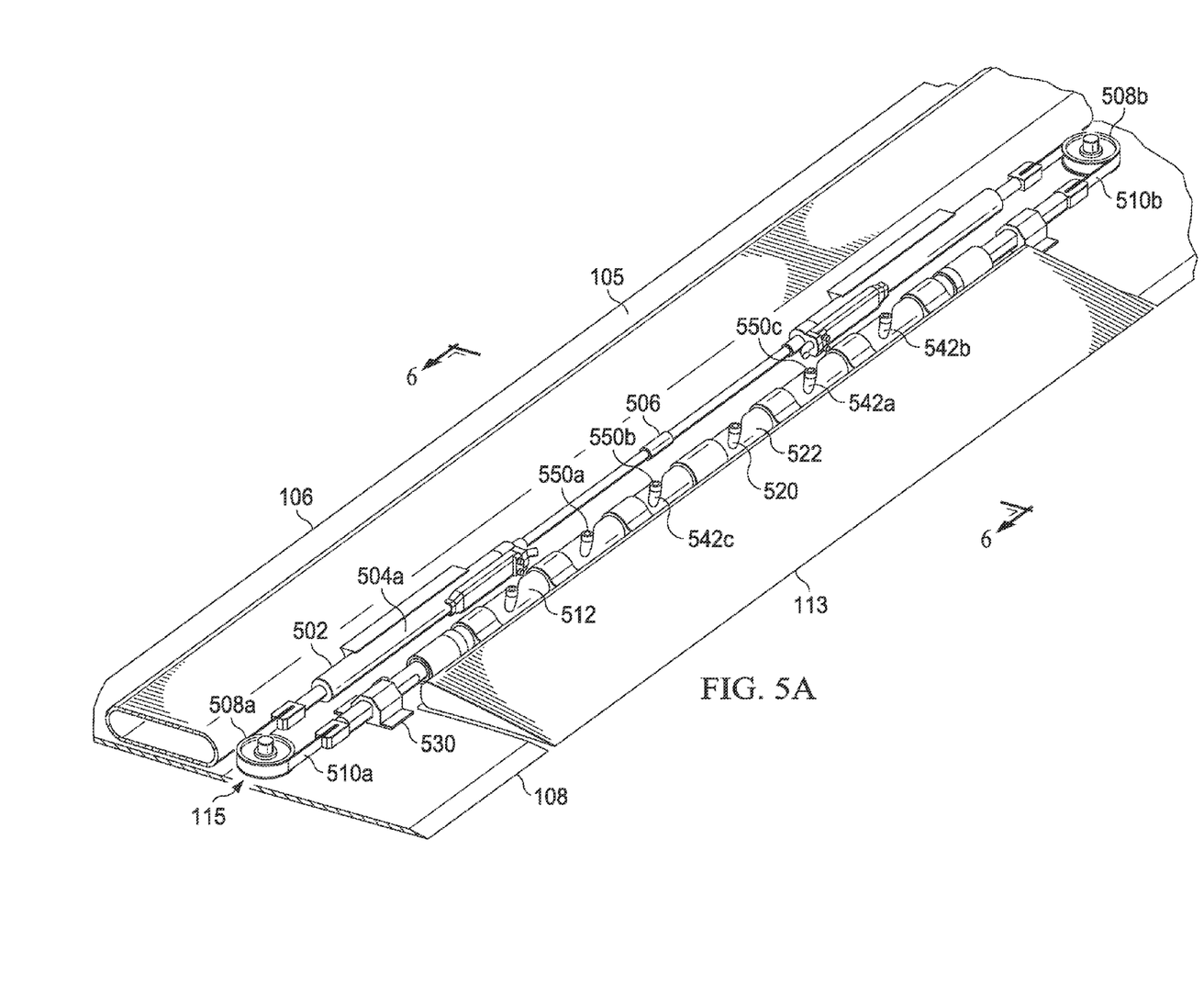
FIGS. 5A and 5B illustrate perspective views of a second implementation of a system to actuate an active blade element attached to a rotor blade.
Figure 5B:
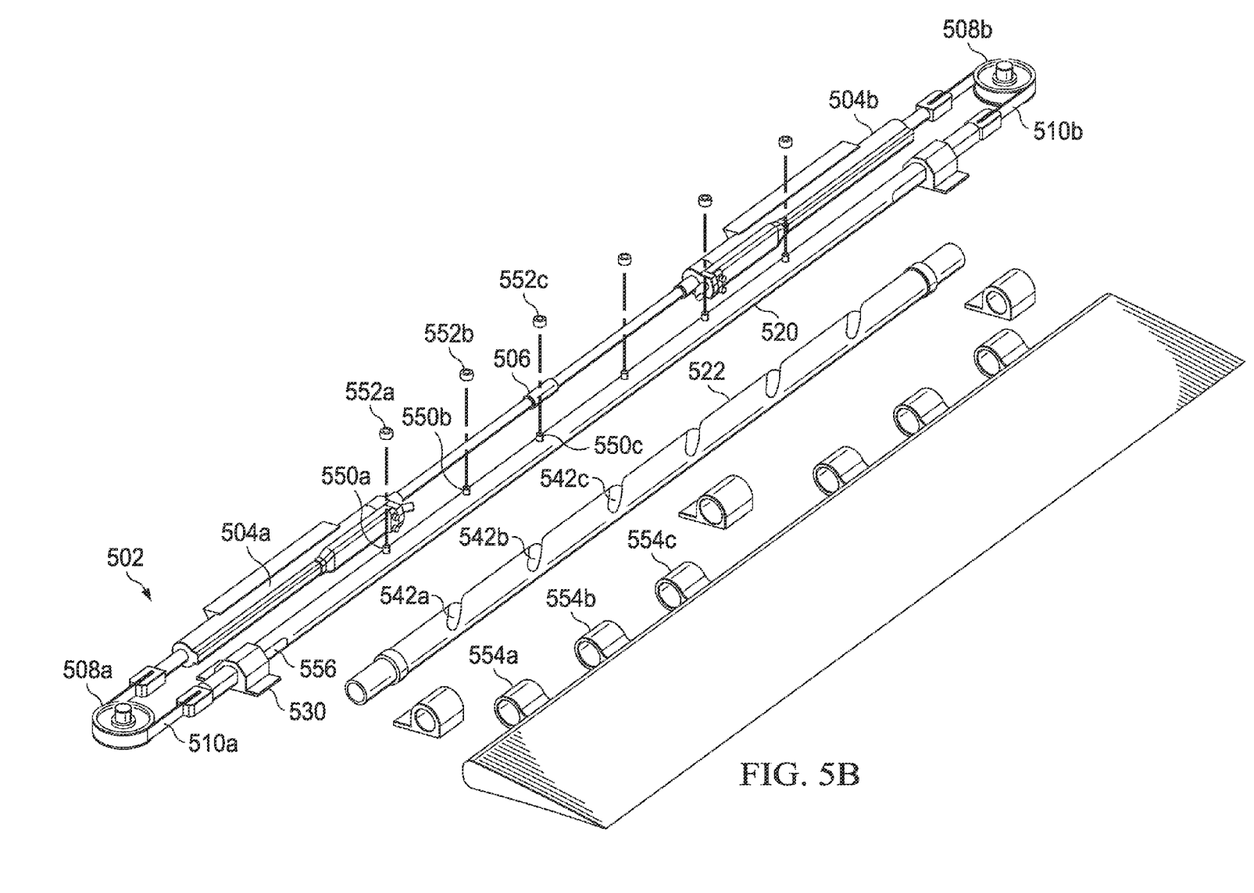
Figure 6:
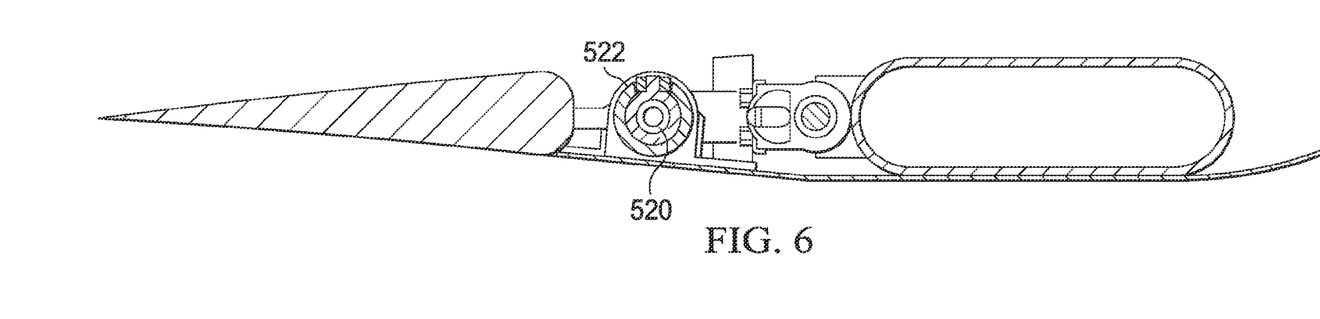
FIG. 6 illustrates a partial cross-sectional view of the system of FIG. 5.

FIGS. 5A and 5B illustrate perspective views and FIG. 6 illustrates a partial cross-sectional view, respectively, of a second implementation of the system 115 to actuate an active blade element (e.g., the flap 113) attached to a rotor blade 105. The system 115 includes an actuator system 502 and a linear transmission system 512. Similar to the first implementation, the actuator system 502 includes one or more linear actuators (e.g., a first linear actuator 504a and a second linear actuator 504b), each of which is attached to the rotor blade 105 in the direction that is spanwise to the rotor blade 105. The one or more linear actuators can be mounted substantially parallel to the spanwise axis of the rotor blade 105, e.g., to the aft wall of the structural spar. One or more coaxially coupled pushrods can connect the one or more linear actuators. For example, the pushrod 506 can connect the first linear actuator 504a and the second linear actuator 504b in a redundancy arrangement.

Similar to the first implementation, the second implementation of the system 115 can include a first pulley 508a and a second pulley 508b attached to the rotor blade 105 near a first end and a second end, respectively, of the actuator system 502. A first ribbon cable 510a and a second ribbon cable 510b can be routed around the first pulley 508a and the second pulley 508b, respectively, to connect the first end and the second end, respectively, of the actuator system 502 to a first end and a second end, respectively, of the linear transmission system 512 using, e.g., devises. In this manner, the first pulley 508a, the first ribbon cable 510a, the second pulley 508b and the second ribbon cable 510b create a pretensioned loop assembly with the actuator system 502. The opposing motion of the one or more pushrods versus the components of the linear transmission system 512 allow for balanced force application within the rotor blade 105.

As shown in FIGS. 5B and 6, the linear transmission system 512 includes an inner elongated tubular member 520 attached to the actuator system 502 to receive the linear motion provided by the actuator system 502. In response to receiving the linear motion provided by the actuator system 502, the inner elongated member 502 traverses linearly in the direction that is spanwise to the rotor blade 105. But for the helical grooves, the inner elongated tubular member 502 of the second implementation of the system 115 can be substantially similar (e.g., identical) to the inner elongated tubular member 302 of the first implementation of the system 115. The inner elongated tubular member 520 can be attached to the rotor blade 105 using slide bearings 530.

The linear transmission system 512 includes an outer elongated tubular member 522 within which the inner elongated tubular member 520 is positioned. Multiple helical grooves (e.g., a first helical groove 542a, a second helical groove 542b, a third helical groove 542c) are formed on an outer surface of the outer elongated tubular member 522. Multiple cylindrical pegs (e.g., a first cylindrical peg 550a, a second cylindrical peg 550b, a third cylindrical peg 550c). A cylindrical peg is attached to an outer surface of the inner elongated tubular member 520 and is positioned in a helical groove formed on the outer surface of the outer elongated tubular member 522. For example, after the inner elongated tubular member 520 has been positioned within the outer elongated tubular member 522, multiple bearing shafts are attached (threadingly or otherwise) to outer surfaces of the inner elongated tubular member 520 that align with the helical grooves of the outer elongated tubular member 522. Roller bearings (e.g., a first roller bearing 552a, a second roller bearing 552b, a third roller bearing 552c) are mounted to the cylindrical pegs, e.g., by attaching to the shafts (threadingly or otherwise). An outer diameter of a roller bearing is substantially equal (e.g., within tolerance limits) to an inner diameter of a helical groove (e.g., within tolerance limits) such that the roller bearing forms a functional rolling fit within the helical groove. Similarly to the dimensions of the roller bearings in the first implementation described above, the dimensions of the roller bearings are selected according to a tolerance stackup for the entire assembly.

The outer elongated tubular member 522 is attached to the flap 113. Similar to the first implementation, the outer elongated tubular member 522 is rigidly attached to the flap 113 using multiple attachment clamps (e.g., a first attachment clamp 554a, a second attachment clamp 554b, a third attachment clamp 554c) positioned at different positions in the direction that is spanwise to the rotor blade 105 and near a leading edge of the flap 113. Also similar to the first implementation, the centerline of the attachment clamps is the axis of rotation of the flap itself. The assembly (i.e., the system 115 and the flap 113) is attached to the rotor blade 105 using multiple attachment clamps (e.g., attachment clamp 556) that incorporate thrust bearings (e.g., ceramic thrust bearings) that can cope with the centrifugal forces on the linear transmission system 312 and the flap 113.

To actuate the flap, the actuator system 502 is operated to generate a linear motion in a direction that is parallel to the spanwise axis of the rotor blade 105. The pre-tensioned loop assembly that includes the ribbon cables transfers the linear motion to the linear transmission system 512. For example, the ribbon cables transfer the linear motion generated by the actuator system 502 to the inner elongated tubular member 520, which traverses linearly in the direction that is spanwise to the rotor blade 105. The linear motion of the inner elongated tubular member 520 causes the roller bearings mounted to the cylindrical pegs to also traverse linearly. Because the helical grooves are formed at an angle to the spanwise axis of the rotor blade 105, and because the bearing races fit into the helical grooves of the outer elongated tubular member 522, the linear motion of the cylindrical pegs generates an at least partial rotational motion of the outer elongated tubular member 522. A range of the rotation is controlled by dimensions of the helical grooves formed on the outer elongated tubular member and the spanwise displacement of the actuators (i.e., the actuator stroke). Because the outer elongated tubular member 522 is attached to the flap 113 (e.g., near the leading edge of the flap 113), the at least partial rotation of the outer elongated tubular member 522 is transferred to the flap 113, thereby actuating the flap 113 to rotate about the axis that is spanwise to the rotor blade 105.

A number of implementations have been described. Nevertheless, it will be understood that various modifications may be made without departing from the spirit and scope of the disclosure.

The invention claimed is:

1. A system to actuate an active blade element attached to a rotor blade, the system comprising:
    an actuator system adapted to attach to an internal surface of a rotor blade, the actuator system adapted to provide a linear motion in response to receiving a control signal, the linear motion being in a direction that is parallel to a spanwise axis of the rotor blade; and
    a linear transmission system attached to the actuator system and to an active blade element attached to the rotor blade, the linear transmission system adapted to receive the linear motion provided by the actuator system, and, in response to the linear motion provided by the actuator system, provide at least a partial rotation of the active blade element about an axis of the linear transmission system, the axis being in the direction that is spanwise to the rotor blade, the linear transmission system comprising:
        an inner elongated tubular member attached to the actuator system adapted to receive the linear motion provided by the actuator system and to traverse linearly in the direction that is parallel to the spanwise axis of the rotor blade responsive to the linear motion provided by the actuator system;
        an outer elongated tubular member positioned outside the inner elongated tubular member, the outer elongated tubular member attached to the active blade element, the outer elongated tubular member connected to the inner elongated tubular member and adapted to at least partially rotate on an axis of the outer elongated tubular member in response to the inner elongated tubular member traversing linearly in the direction that is spanwise to the rotor blade; and
        a central elongated tubular member positioned between the inner elongated tubular member and the outer elongated tubular member, the central elongated tubular member attached to the rotor blade.

2. The system of claim 1, wherein the actuator system comprises:
    a first linear actuator attached to the rotor blade in the direction that is parallel to the spanwise axis of the rotor blade; and
    a second linear actuator attached to the rotor blade in the direction that is parallel to the spanwise axis of the rotor blade.

3. The system of claim 2, wherein the actuator system further comprises one or more coaxially coupled pushrods that connect the first linear actuator and the second linear actuator in a redundancy arrangement.

4. The system of claim 1, further comprising:
    a first pulley attached to the rotor blade near a first end of the actuator system;
    a first ribbon cable routed around the first pulley to connect the first end of the actuator system and a first end of the linear transmission system;
    a second pulley attached to the rotor blade near a second end of the actuator system; and a second ribbon cable routed around the second pulley to connect the second end of the actuator system and a second end of the linear transmission system.

5. The system of claim 4, wherein the first pulley, the first ribbon cable, the second pulley, and the second ribbon cable create a pre-tensioned loop assembly with the actuator system.

6. The system of claim 1, wherein the inner elongated tubular member is attached to the rotor blade using linear slide bearings.

7. The system of claim 1, wherein the central elongated tubular member including a plurality of spanwise slots formed on an outer surface of the central elongated tubular member, the plurality of spanwise slots arranged in the direction that is parallel to the spanwise axis of the rotor blade.

8. The system of claim 7, wherein the inner elongated tubular member includes a plurality of first helical grooves formed in a first direction on an outer surface of the inner elongated tubular member, and wherein the outer elongated tubular member includes a plurality of second helical grooves formed in a second direction that is opposite to the first direction.

9. The system of claim 8, wherein a first helical groove, a spanwise slot, and a second helical groove intersect when the inner elongated tubular member, the central elongated tubular member and the outer elongated tubular member are positioned in the linear transmission system.

10. The system of claim 9, further comprising a plurality of ball bearings, a ball bearing positioned in a spanwise slot at an intersection of the first helical groove, the spanwise slot and the second helical groove.

11. The system of claim 1, wherein the outer elongated tubular member includes a plurality of helical grooves formed on an outer surface of the outer elongated tubular member.

12. The system of claim 11, further comprising:
a plurality of cylindrical pegs, a cylindrical peg attached to an outer surface of the inner elongated tubular member and positioned in a helical groove formed on the outer surface of the outer elongated tubular member; and
a plurality of roller bearings, a roller bearing mounted to a cylindrical peg to form a functional fit and rotate within the helical groove.

13. A method to actuate an active blade element attached to a rotor blade, the method comprising:
generating a linear motion of an actuator system attached to a rotor blade in a direction that is parallel to a spanwise axis of the rotor blade;
transferring the linear motion of the actuator system to a linear transmission system attached to the rotor blade in the direction that is parallel to the spanwise axis of the rotor blade;
generating an at least partial rotation of the linear transmission system in response to the linear motion of the actuator system; and
transferring the at least partial rotation of the linear transmission system to an active blade element attached to the rotor blade; and
wherein the linear transmission system comprises:
an inner elongated tubular member attached to the rotor blade; and
an outer elongated tubular member attached to the active blade element, the outer elongated tubular member including a plurality of helical grooves on an outer surface of the outer elongated tubular member.

14. The method of claim 13, wherein the actuator system comprises a push rod that is connected to the linear transmission system using a ribbon cable routed around a pulley attached to the rotor blade, wherein transferring the linear motion of the actuator system to the linear transmission system comprises providing a control signal to rotate the pulley.

15. The method of claim 13, wherein the linear transmission system further comprises:
a plurality of cylindrical pegs, a cylindrical peg positioned in a helical groove of the plurality of helical grooves; and
a plurality of roller bearings, a roller bearing mounted to a cylindrical peg of the plurality of cylindrical pegs to form a functional fit and rotate within the helical groove; and
wherein generating the at least partial rotation of the linear transmission system in response to the linear motion of the actuator system comprises rotating the cylindrical peg in the helical groove in response to receiving the linear motion of the actuator system.

16. The method of claim 13, wherein
the inner elongated tubular member is attached to the rotor blade through slider bearings to allow for motion in the spanwise direction, the inner elongated tubular member including a plurality of first helical grooves formed in a first direction on an outer surface of the inner elongated tubular member;
wherein the outer elongated tubular member rigidly attaches to the active blade element through journal bearings to allow rotational motion, the outer elongated tubular member including the plurality of helical grooves, the plurality of helical grooves comprising a plurality of second helical grooves formed in a direction opposite the first direction on the outer surface of the outer elongated tubular member; and
the linear transmission system further comprises a central elongated tubular member positioned and fixed rigidly to the blade between the inner elongated tubular member and the outer elongated tubular member, the central elongated tubular member including a plurality of spanwise slots arranged in the direction spanwise to the rotor blade, wherein a first helical groove, a spanwise slot, and a second helical groove intersect,
wherein generating the at least partial rotation of the linear transmission system output in response to the linear motion of the actuator system comprises generating a linear motion of the inner elongated tubular member in the direction that is spanwise to the rotor blade resulting in at least a partial rotation of the outer elongated tubular member.

17. A system to actuate an active blade element attached to a rotor blade, the system comprising
an actuator system attached to a rotor blade and adapted to provide a linear motion in a direction that is spanwise to the rotor blade; and
a linear transmission system comprising:
an inner elongated tubular member attached to the actuator system and adapted to traverse linearly in the direction that is spanwise to the rotor blade in response to receiving the linear motion provided by the actuator system; and
an outer elongated tubular member positioned concentrically with the inner elongated tubular member and attached to an active blade element of the rotor blade, the outer elongated tubular member adapted to at least partially rotate about an axis that is in the direction that is spanwise to the rotor blade in response to the inner elongated tubular member traversing linearly, wherein the outer elongated tubular member includes a plurality of helical grooves formed on an outer surface of the outer elongated tubular member.

18. The system of claim 17, wherein the actuator system and the linear transmission system are centered at a position that is substantially three-quarters of the rotor blade length measured from a root end of the rotor blade.

19. The system of claim 17, further comprising:
a plurality of cylindrical pegs, a cylindrical peg attached to an outer surface of the inner elongated tubular member and positioned in a helical groove of the plurality of helical grooves formed on the outer surface of the outer elongated tubular member; and
a plurality of roller bearings, a roller bearing mounted to a cylindrical peg to form a functional fit and rotate within the helical groove of the plurality of helical grooves.

* * * * *